Patented Nov. 21, 1933

1,936,090

UNITED STATES PATENT OFFICE 1,936,090

PRODUCTION OF AMINO ARALKYLARYL ACID

Alphons O. Jaeger, Mount Lebanon, Pa., assignor to The Selden Company, Pittsburgh, Pa., a corporation of Delaware No Drawing. Application March 6, 1931
Serial No. 520,718

15 Claims. (Cl. 260—64)

This invention relates to the production of amino aralkylaryl compounds, substituted and unsubstituted, by reaction of the corresponding halogen compounds with ammonia or ammonium compounds.

According to the invention the amino compounds are produced by autoclaving or otherwise heating soluble ammonium salts or aqueous ammonia, with or without the use of catalysts such as copper, copper chloride, or other copper salts, with mono or poly halogen substituted aralkylaryl compounds, having the following structural formula:

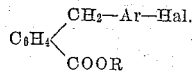

in which Ar may be any mononuclear or polynuclear aromatic group, Hal. may be one or several halogen substituents, and R is hydrogen or a positive radical, it being understood that the C₆H₄ group may also be substituted if desired. The Ar group may contain other substituents in addition to halogen, for example it may be a chlortolyl or chlor-xylyl group.

Amino compounds obtained from aralkylaryl compounds of the above formula in which Ar is polynuclear are also included in the invention. In such compounds the polynuclear group may be a diphenyl, polyphenyl, diphenoxy, polyphenoxy or other similar groups such as for example

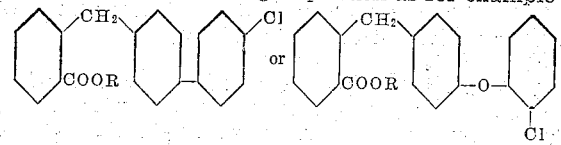

or a condensed nucleus such as naphthalene, anthracene, acenaphthene, phenanthrene and the like may be present, it being understood that these polynuclear groups may also be either mono or poly halogen substituted and may contain additional non-halogen substituents.

The products of the present invention can be ring closed to the corresponding anthrone compounds, yielding valuable intermediates for the production of vat dyes, and for this purpose it is preferable to employ halogenated compounds such that the substituted amino group does not interfere with the ring closure. Consequently the preferred products are those in which the NH₂ of the aryl nucleus is not ortho to the linkage of the aralkyl group, and in the case of the polynuclear compounds the substitution is preferably in the nucleus farthest removed from this group.

The halogen substituted compounds from which the amino compounds of the present invention are prepared are preferably produced by the reaction of phthalide with suitable halogen substituted hydrocarbons by the Friedel-Craft's reaction. While they are for the most part new chemical products they are not claimed as such in the present application, which is limited to the amino compounds produced from them by reaction with ammonia. The new products, and their preparation by the Friedel-Craft reaction, are claimed in my copending applications Serial Nos. 518,902, 518,903, filed February 27, 1931.

The invention will be further illustrated by the following examples, in which the parts are by weight.

Example 1

A mixture of phthalide and chlorbenzene, brombenzene or equivalent amounts of ortho-dichlorbenzene, the latter somewhat in excess of molecular proportions is treated with an amount of aluminum chloride from 2 to 2½ times the weight of phthalide. The aluminum chloride, which should be anhydrous and of good quality, is added to the solution with vigorous stirring at a temperature from 15 to 20° C. After all of the aluminum chloride has been added, the reaction mixture is gradually heated up to 40° C. over a period of about 1 hour, the agitation being continuously maintained. After reaching 40° C. the reaction mixture is maintained at this temperature for 2–2½ hours, and the temperature is then raised to about 60° C. in order to complete the reaction. After reaction is complete, which is usually indicated by the fact that hydrogen chloride is no longer given off, the batch is allowed to cool to room temperature with continued stirring, the aluminum compound then being added slowly to 2,000–3,000 parts by weight of iced 10% sulfuric acid with vigorous agitation. An excellent yield of p-chlorbenzylbenzoic acid is obtained.

Instead of using phthalides, substituted phthalide such as chlor- or nitro-phthalide may be used. The corresponding substituted chlorbenzylbenzoic acids are obtained.

The mono or dichlorphenyl benzyl benzoic acid so obtained is mixed with an excess of ammonium hydroxide together with small amounts of cuprous chloride and is heated in an autoclave for 15–20 hours at 200–215° C., preferably with continuous stirring. The excess ammonia is removed by steam, the ammonium compound taken up in hot water and filtered and the hydrochloride of the acid amine liberated with hydrochloric acid. The product may be further purified by recrystallization if desired, after which the free amino compound is liberated by neutralization with ammonia.

Example 2

1 mol of phthalide and from 1 to 1½ mols of orthochlortoluene are mixed with an amount of aluminum chloride from 2–3 times the weight of phthalide at about 18° C. with vigorous stirring. The agitation is maintained for about an hour or until the rapid evolution of hydrogen chloride ceases, whereupon the mixture is heated up to about 40° C. and maintained at this temperature for an hour and a half. The reaction mixture is then heated up to from 40 to 75° C., at which temperature the reaction is completed. After evolution of hydrogen chloride has ceased, the bath is permitted to cool to room temperature and 3–4 chlortolylbenzoic acid is separated as described in Example 1.

Instead of using chlortoluene, bromtoluene or any other chlortoluene may be used, the corresponding tolyl benzoic acids being obtained.

The aralkylaryl acid compound so produced is mixed with excess ammonium hydroxide or soluble ammonium salts such as the chloride, carbonate, etc. and a mixture of finely divided copper and cuprous chloride and heated for 10–15 hours at temperatures of 200–220° C. The excess ammonia is removed and the product neutralized with dilute acid, a product of good purity being obtained which may be further recrystallized from hot water if desired.

Example 3

1 mol of phthalide and 1 mol of 2-chlorodiphenyl are mixed with aluminum chloride in a considerable amount of excess over molecular proportions and an amount of tetrachlorethane sufficient to give a readily stirrable solution at a temperature of about 20° C. and thoroughly agitated for about two hours or until the hydrogen chloride is no longer rapidly evolved. The reaction mixture is then heated up to from 40 to 75° C. until the evolution of hydrogen chloride is completed, the stirring being maintained continuously. The mixture is then cooled to room temperature and the acid separated as in Example 1.

Instead of using 2-chlorodiphenyl, 4-chlorodiphenyl may be used, and substituted phthalides may also be employed. The corresponding bromo compounds may likewise be produced, starting out from bromdiphenyls.

The product so obtained is heated with ammonia and copper catalysts as in previous examples for 10–20 hours at temperatures of 200–220° C. and the resulting amino compound poured into water and neutralized as before. The free amino acid obtained is of good quality and may vary from brown to light yellow in color.

Example 4

1 mol of phthalide is mixed with 1 mol of halogen substituted diphenyl oxide, such as 2-chloro, 4-chloro or the corresponding bromo-diphenyl oxides and an amount of aluminum chloride equal to about 2½ times the weight of the phthalide is mixed in a carbon disulfide solution or nitrobenzene solutions at room temperature or, if desired, the solvent may be eliminated and the reagents caused to react in a ball mill. After evolution of hydrogen chloride has ceased, the reaction mixture is heated up to 40 to 75° C., care being taken in the case of volatile solvents that the temperature remains below the boiling point of the solvent or pressure is used. The heating is continued until the evolution of hydrogen chloride ceases, vigorous agitation being provided and maintained while the batch cools, whereupon the acid is isolated with dilute sulfuric acid.

Instead of using unsubstituted diphenyl oxide, halogen substituted diphenyl oxides, such as 2-chloro-, 4-chloro-, or the corresponding bromodiphenyl oxides may be used, and similarly substituted phthalides may be used in place of the unsubstituted phthalide.

The aralkylaryl acid is mixed with excess ammonium hydroxide, 0.4–0.6% cuprous chloride are added and the mixture is heated with continuous agitation at 210–230° C. for 10–15 hours. The excess ammonia is distilled off with steam, and the product poured into water and acidified with hydrochloric acid, which liberates the free acid from the ammonium salt and forms the hydrochloride of the amine.

This is purified by recrystallization, if necessary, and the product carefully neutralized in case the amino compound itself is desired.

Example 5

1 mol of phthalide and 1 mol of alphachlor naphthalene are mixed in carbon disulfide or tetrachlor ethane solution and an amount of aluminum chloride from 2 to 3 times the weight of the phthalide is added at a temperature from 15 to 20° C., vigorous agitation being provided and the temperature gradually raised to 45° C., at which temperature the mixture is maintained for about 2 to 2½ hours or until the evolution of hydrogen chloride has substantially ceased, whereupon the temperature may be raised to 65° C. and maintained at this temperature for several hours. After the reaction is complete, the batch is allowed to cool and the acid is isolated as described in Example 1.

The reaction product is heated with ammonium hydroxide and a copper catalyst as in previous examples, or a secondary amine may be formed by heating with an excess of methyl amine, aniline or other primary amine. The product is liberated with hydrochloric acid and further purified by recrystallization if necessary.

What is claimed as new is:

1. A process of preparing amino aralkylaryl carboxylic acid substances which comprises effecting reaction between a primary amine and a compound having the formula

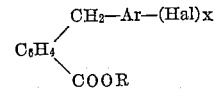

in which R is hydrogen or a positive group, Ar is an aromatic nucleus, Hal is halogen and X is one or more.

2. Process according to claim 1, in which Ar is mononuclear.

3. An amino aralkylaryl carboxylic acid substance having the formula

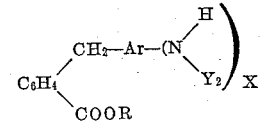

in which R is hydrogen or a positive group, Ar is an aromatic nucleus, X is one or more and $Y_2$ is an alkyl or aryl radical.

4. An amino aralkylaryl carboxylic acid substance having the formula

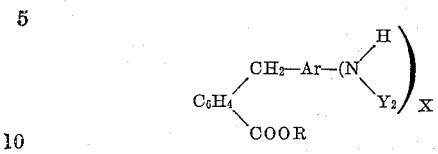

in which R is hydrogen or a positive group, Ar is a mononuclear aromatic nucleus, X is one or more and $Y_2$ is an alkyl or aryl radical.

5. An amino aralkylaryl carboxylic acid substance having the formula

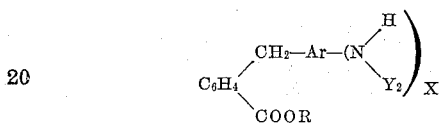

in which R is hydrogen or a positive group, Ar is a polynuclear aromatic nucleus, X is one more and $Y_2$ is hydrogen or an alkyl or aryl radical.

6. An amino aralkylaryl carboxylic acid substance having the formula

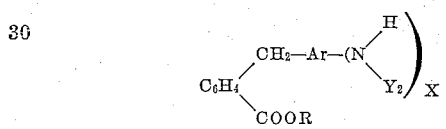

in which R is hydrogen or a positive group, Ar is an aromatic nucleus containing a plurality of separate aromatic groups, X is one or more and $Y_2$ is hydrogen or an alkyl or aryl radical.

7. An amino aralkylaryl carboxylic acid substance having the formula

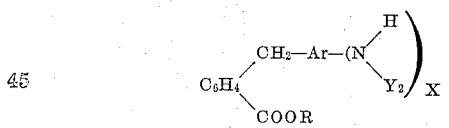

in which R is hydrogen or a positive group, Ar is a condensed polynuclear aromatic nucleus, X is one or more and $Y_2$ is hydrogen or an alkyl or aryl radical.

8. A process of preparing amino aralkylaryl carboxylic acid substances, which comprises effecting reaction between a compound included in the group consisting of ammonia, soluble ammonium salts, primary amines, and a compound having the formula

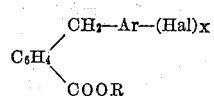

in which R is hydrogen or a positive group, Ar is a diphenyl group, Hal is halogen, and X is one or more.

9. A process of preparing amino aralkylaryl carboxylic acid substances, which comprises effecting reaction between a compound included in the group consisting of ammonia, soluble ammonium salts, primary amines, and a compound having the formula

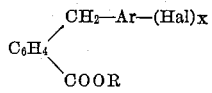

in which R is hydrogen or a positive group, Ar is a polynuclear aromatic nucleus, Hal is halogen, and X is one or more.

10. A process of preparing amino aralkylaryl carboxylic acid substances, which comprises effecting reaction between a compound included in the group consisting of ammonia, soluble ammonium salts, primary amines, and a compound having the formula

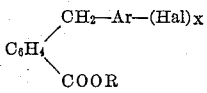

in which R is hydrogen or a positive group, Ar is a naphthalene group, Hal is halogen, and X is one or more.

11. A process of preparing amino aralkylaryl compounds, which comprises causing a phthalide to react with a halogenated aromatic nucleus in the presence of aluminum chloride, hydrolyzing the aluminum chloride addition product formed to produce halogenated diaryl methane carboxylic acid, and treating the acid without complete purification with a compound included in the group ammonia, soluble ammonium salts, primary amines.

12. A method according to claim 11, in which the aromatic nucleus is a halogenated member of the benzene series.

13. A method according to claim 11, in which the aromatic nucleus is chlorbenzene.

14. A method according to claim 11, in which the aromatic nucleus is a naphthalene group.

15. A method according to claim 11, in which the aromatic nucleus is a diphenyl group.

ALPHONS O. JAEGER.